US008302190B2

(12) United States Patent
Li

(10) Patent No.: US 8,302,190 B2
(45) Date of Patent: Oct. 30, 2012

(54) METHOD AND APPARATUS FOR DEFENDING AGAINST ARP SPOOFING ATTACKS

(75) Inventor: Zhenhai Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

(21) Appl. No.: 12/647,336

(22) Filed: Dec. 24, 2009

(65) Prior Publication Data

US 2010/0107250 A1 Apr. 29, 2010

Related U.S. Application Data

(63) Continuation of application No. PCT/CN2008/072240, filed on Sep. 2, 2008.

(30) Foreign Application Priority Data

Sep. 6, 2007 (CN) .......................... 2007 1 0121472

(51) Int. Cl.
*H04L 29/06* (2006.01)
(52) U.S. Cl. .......................... 726/22; 726/3; 370/395.54
(58) Field of Classification Search .................... 726/22; 723/3
See application file for complete search history.

(56) References Cited

U.S. PATENT DOCUMENTS

| 7,464,183 B1* | 12/2008 | Ioffe et al. ..................... 709/245 |
| 2005/0198242 A1 | 9/2005 | Kim |
| 2007/0253430 A1* | 11/2007 | Minami et al. ........... 370/395.52 |

FOREIGN PATENT DOCUMENTS

| CN | 1855929 A | 11/2006 |
| CN | 1921491 A | 2/2007 |
| CN | 1925493 A | 3/2007 |
| CN | 101110821 A | 1/2008 |
| KR | 20040109985 A | 12/2004 |

OTHER PUBLICATIONS

Abad, et al.; "An Analysis on the Schemes for Detecting and Preventing ARP Cache Poisoning Attacks"; 27th International Conference on Distributed Computing Systems Workshops (ICDCSW'07); 2007.*

(Continued)

*Primary Examiner* — Jason K. Gee
*Assistant Examiner* — Ayoub Alata
(74) *Attorney, Agent, or Firm* — Leydig, Voit & Mayer, Ltd.

(57) ABSTRACT

A method and an apparatus for defending against Address Resolution Protocol (ARP) spoofing attacks are disclosed. When a network device receives an ARP message, the network judges whether the MAC address of the received ARP message is the same as the MAC address in an ARP entry, if the MAC addresses are different, the network device determines the received ARP message as an ambiguous ARP message and starts an ARP verification process, and makes further process according to the result of the ARP verification process. In this way, when no address spoofing attacks occur, no verification messages are generated, and thus reducing signaling interactions and saving network resources; besides, spoofing attacks possibly happening at any time are avoided, which effectively prevents address spoofing attacks via random scanning and protects the normal application of the real host.

13 Claims, 3 Drawing Sheets

OTHER PUBLICATIONS

Written Opinion of the International Searching Authority in corresponding PCT Application No. PCT/CN2008/072240 (Dec. 11, 2008).

International Search Report in corresponding PCT Application No. PCT/CN2008/072240 (Dec. 11, 2008).

1st Office Action in corresponding Chinese Application No. 200710121472.2 (Jun. 26, 2009).

Extended European Search Report in corresponding European Application No. 08800752.1 (May 12, 2010).

Kanamori et al., "A Self-Confirming Engine for Preventing Man-in-the-Middle Attack," Special Section on Internet Technology IV, IEEE Trans. Commun., Mar. 2004, vol. E87B, No. 3, Institute of Electrical and Electronic Engineers, Ikoma-shi, Japan.

\* cited by examiner

METHOD AND APPARATUS FOR DEFENDING AGAINST ARP SPOOFING ATTACKS

CROSS-REFERENCE TO RELATED APPLICATIONS

This application is a continuation of International Application No. PCT/CN2008/072240, filed on Sep. 2, 2008, which claims priority to Chinese Patent Application No. 200710121472.2, filed on Sep. 6, 2007, both of which are hereby incorporated by reference in their entireties

FIELD OF THE INVENTION

The present invention relates to network communications, and in particular, to a method and an apparatus for defending against ARP spoofing attacks on a network.

BACKGROUND OF THE INVENTION

In the present network environment, the Address Resolution Protocol (ARP) is a lower layer protocol in the Transmission Control Protocol/Internet Protocol (TCP/IP) stack. The purpose of ARP is to translate IP addresses to Media Access Control (MAC) addresses which are Ethernet physical addresses. Communication between network devices uses MAC addresses but TCP/IP based applications use IP addresses. All data packets based on IP addressing need to be finally encapsulated in MAC addressing based Ethernet frames for transmission. Therefore, when a network device is in communication, the network device must resolve the peer MAC address from the peer IP address via a protocol. The protocol that executes the resolution is ARP.

To achieve faster address translation, an ARP-enabled network device always adopts the ARP cache technology to cache a certain number of address mapping relationships in a local table structure which is generally called the ARP cache table (ARP table for short). ARP cache entries have two sources: one is dynamical generation according to ARP messages, which means the device may learn the mapping between an IP address and an MAC address from an ARP request or an ARP response to generate a dynamic ARP cache entry; the other is static manual configuration. To keep the validity of dynamic ARP cache entries, the dynamic entries are aged in a certain time. Statically configured entries are not aged. Their addition or removal depends on manual operations.

ARP protocol processing is complex. Normally, the forwarding plane receives an ARP message and forwards the message to the control plane for processing. The control plane generates an ARP cache entry and delivers the entry to the ARP cache table of the forwarding plane. The forwarding plane uses the ARP cache entry to encapsulate and send messages. In the prior art, the ARP processing provides only simple mapping between higher layer protocol addresses and lower layer physical addresses without any security authentication of such mapping. In a complex network environment like Internet access, such simplicity and openness give chances for address spoofing attacks. The ARP spoofing attack generally aims to steal private information about a user. The attacker sends ARP requests or responses carrying incorrect address mapping to pollute the ARP cache table of a network device. As a result, the network device sends data packets to wrong physical address. The network device may be a gateway or a host, or any other network device. To defend the ARP cache table of the network device against address spoofing attacks, the prior art provides the following solutions:

(1) Sticky ARP

After the sticky ARP features are enabled, an ARP cache entry learned from either an ARP request or an ARP response is not updated until the entry is aged. After being aged, the ARP cache entry is deleted and a new learning process begins. The solution is simple but results in a problem. That is, once an ARP cache entry is generated by the network device according to an ARP attack message which arrives earlier than a legal ARP message, the host is not able to create a correct ARP cache entry in the network device, so that the use of the host is impacted and that ARP spoofing is not defended.

(2) Active Verification

After the network device receives an ARP request or an ARP response, the network device always sends an ARP request to the IP address carried in the received ARP message to verify the address mapping. If the address does not exist, the network device does not receive an ARP response from the IP address. If the MAC address in the ARP cache entry corresponding to the IP address is spoofed, the network device receives an ARP response which carries a different MAC address. In whichever case, the network device is aware of the spoofing and can therefore perform corresponding processing. The weakness of this solution is that such verification is performed on ARP messages from every IP address. If no spoofing attacks happen, the solution causes a waste of network bandwidths and impacts the network performance.

To conclude, during the implementation of the present invention, the inventor finds that the prior art has at least the following problem: the existing solutions to the defending against ARP spoofing attacks lack reliable and effective verification and causes a waste of network bandwidths and impact the performance if no spoofing attacks happen.

SUMMARY OF THE INVENTION

Embodiments of the present invention provide a method and an apparatus for defending against ARP spoofing attacks to enable reliable and effective ARP verification, reduce signaling interactions and save network resources.

The objectives of the embodiments of the present invention are achieved through the following technical solution:

A method for defending against ARP spoofing attacks includes:
  when an ARP entry is updatable, judging whether the MAC address in a received ARP message is the same as the MAC address in the ARP entry, where the ARP message has the same IP address as the ARP entry; and
  if the MAC addresses are different and starting an ARP verification process, determining that the received ARP message is an ambiguous ARP message.

An apparatus for defending against ARP spoofing attacks includes:
  a reception judging unit, configured to: when an ARP entry is updatable, judge whether the MAC address in a received ARP message is the same as the MAC address in the ARP entry, where the ARP message has the same IP address as the ARP entry, and if the MAC addresses are different, determine the received ARP message as an ambiguous ARP message and send a judgment result to a verifying unit; and
  the verifying unit, configured to start an ARP verification process according to the judgment result from the reception judging unit.

In the above technical solution, when an ARP entry is updatable, the first thing is to judge whether the MAC address of a received ARP message is the same as the MAC address in the ARP entry, where the ARP message has the same IP address as the ARP entry. If the MAC addresses are different, the received ARP message is determined as an ambiguous ARP message. In this case, an ARP verification process is started. If the MAC addresses are the same, no ARP verification is started. In this way, when no ambiguous ARP entry update is received, ARP verification is unnecessary, thus reducing signaling interactions and saving network resources.

DETAILED DESCRIPTION OF THE INVENTION

The embodiments of the present invention provide a method and an apparatus for defending against ARP spoofing attacks. When an ARP entry is updatable, if the MAC address in a received ARP message that has a same IP address as the ARP entry is the same as the MAC address in the ARP entry, it is determined that the received ARP message is not an ambiguous ARP message. This means no address spoofing occurs. In this case, no verification process is started so that no verification signaling overhead is added. Once an ambiguous ARP message is received later, an ARP verification process is started to send an ARP verification request to the IP address carried in the ambiguous ARP message. In this way, when no ambiguous ARP message is received, which means no address spoofing occurs, no additional verification message is generated. Therefore, signaling interactions are reduced and network resources are saved.

In addition, when an ARP entry is not updatable, the ARP entry is locked. In this case, when another ARP message is received, it is unnecessary to judge the MAC address in the ARP message and no verification is started. Thus, no additional verification signaling overhead is caused.

Normally, after the ARP verification request is sent, an ARP verification response is received. The network device can then compare the MAC address in the ARP verification response, the MAC address in the ARP entry and the MAC address in the ambiguous ARP message. If the network device is able to make an optimal judgment according to the comparison result to decide the real MAC address, the network device takes the ARP entry with the real MAC address as the optimal ARP entry and locks it as the optimal ARP entry. This means that the ARP entry is not updatable until the ARP entry is aged. In this way, the network device can deny possible spoofing attacks happening at any time and prevent address spoofing attacks by using random scanning and protect the normal application of the real host.

To better explain the present invention, the embodiments of the present invention are described with reference to the accompanying drawings.

Figure 1:
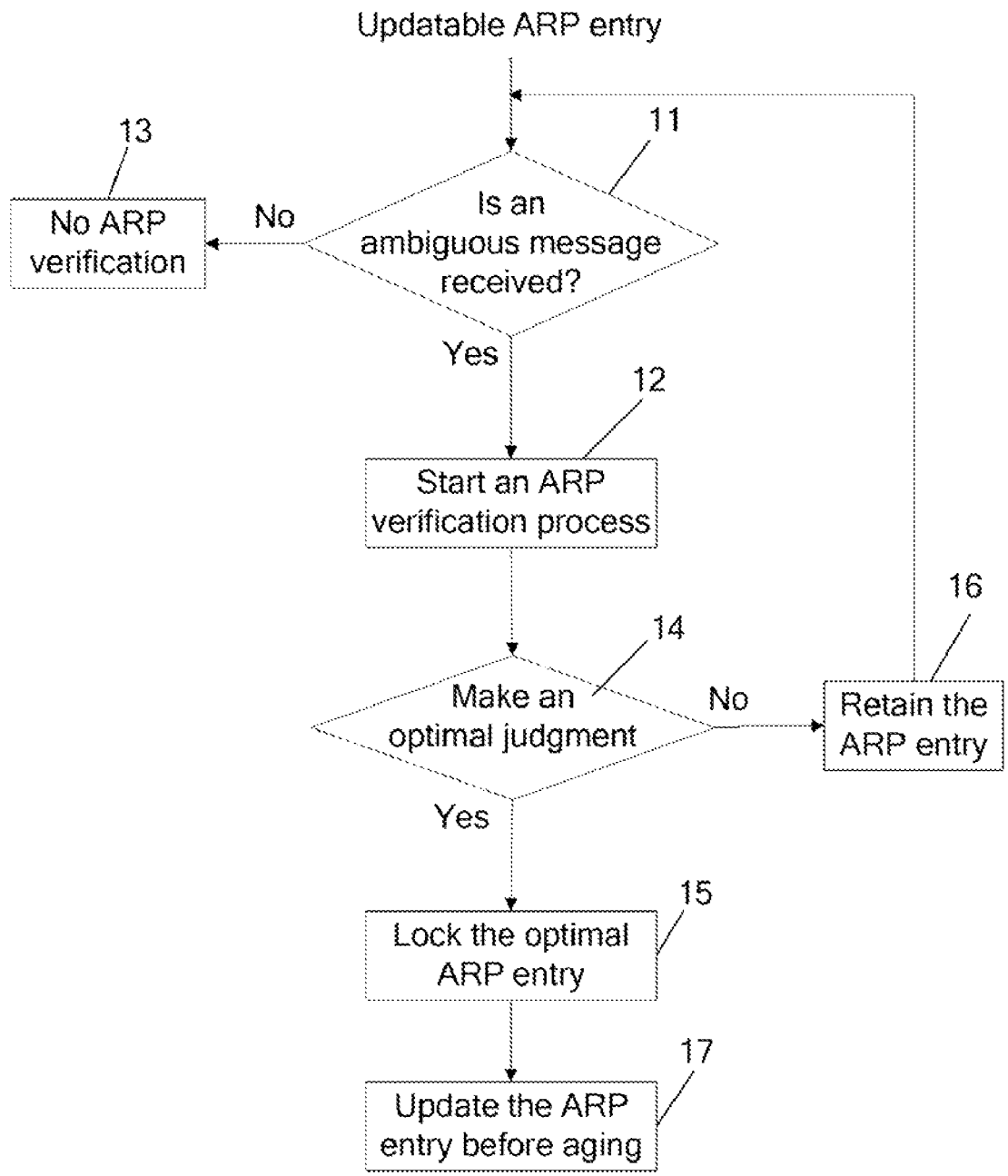
FIG. 1 is a schematic diagram of a method provided according to an embodiment of the present invention.

FIG. 1 is a schematic diagram of the method according to an embodiment of the present invention. The method includes the following steps:

Step 11: Determine whether an ambiguous ARP message is received.

When an ARP entry is updatable, for example, at the initial learning of the ARP entry, this step is the same as normal processing. That is, the ARP entry is generated by learning from an ARP request or an ARP response, and the ARP entry is used as the initially learned ARP entry. This means the network device uses the ARP entry to encapsulate messages to be forwarded. At this time, the initially learned ARP entry is updatable.

If a later received ARP message that has the same IP address as the ARP entry is an ambiguous ARP message, which means the MAC address in the ARP message is different from the MAC address in the ARP entry, it is necessary to execute step 12 to validate the ARP entry. If a later received ARP message has the same MAC address as the ARP entry, step 13 is executed.

Step 12: Initiate an ARP verification process and then execute step 14.

The ARP verification process is to send an ARP verification request to the IP address and make a judgment according to the MAC address carried in the received ARP verification response. For example, an ARP request is broadcasted to all network devices in the network segment, requesting the MAC address associated with the IP address. After the network device that has the IP address receives the ARP request, the network device unicasts an ARP response to the requester to notify the requester of its MAC address. After receiving the ARP response, the network device, namely, the requester, can use the MAC address carried in the ARP response to make a verification judgment.

In addition, when the ARP verification is initiated, it is necessary to set the ARP entry so that the entry accepts only the update from an ARP response, which means the entry is not updated until an ARP verification response is received. This can prevent that a verification judgment cannot be made, which is caused by the entry being updated before the ARP verification response is received Step 13: Use the ARP entry as a normal ARP entry without an ARP verification process.

Because no verification is started, there is no additional verification signaling overhead. Therefore, when no address spoofing occurs, no additional verification message is generated, and thus reducing signaling interactions and saving network resources.

Step 14: Make a comparison and an optimal judgment. When step 12 is executed to start an ARP verification process, it is necessary to make a verification judgment according to the MAC address carried in the ARP verification response. Specifically, the MAC address in the ARP verification response is compared with the MAC address in the ARP entry, and the MAC address in the ambiguous ARP message.

If the MAC address in the received ARP verification response is the same as one of the other two MAC addresses, which means the MAC address in the ARP verification response is the same as the MAC address in the ARP entry, or the same as the MAC address in the ambiguous ARP message, an optimal judgment can be made to use the ARP entry that has the same MAC address as the optimal ARP entry and then step 15 is executed. If the MAC address in the received ARP verification response is different from the other two MAC addresses, an optimal judgment is impossible and step 16 is executed.

Step 15: Lock the optimal ARP entry and execute step 17.

Locking the optimal ARP entry means the ARP entry is not updated before the optimal ARP entry is aged. In this way, address spoofing happening possibly at any time is denied and the verification process is more reliable and more effective.

Step 16: Retain the ARP entry. The old ARP entry is not changed and is still used as a normal ARP entry. Then the procedure goes back to step 11 to determine whether an ambiguous ARP message is received.

Step 17: Update the ARP entry before its aging. Specifically, before the optimal ARP entry is aged, an ARP request is sent to start a new learning process.

In addition, a counter may be set with respect to the ARP entry. When the number of ARP verifications reaches a specified counter value within an aging cycle of the entry, no verification is initiated with respect to the ARP entry. Thus, when large-traffic address spoofing attacks occur, the network device does not send too many verification messages to consume excessive CPU resources so that device resources are saved.

Figure 2:
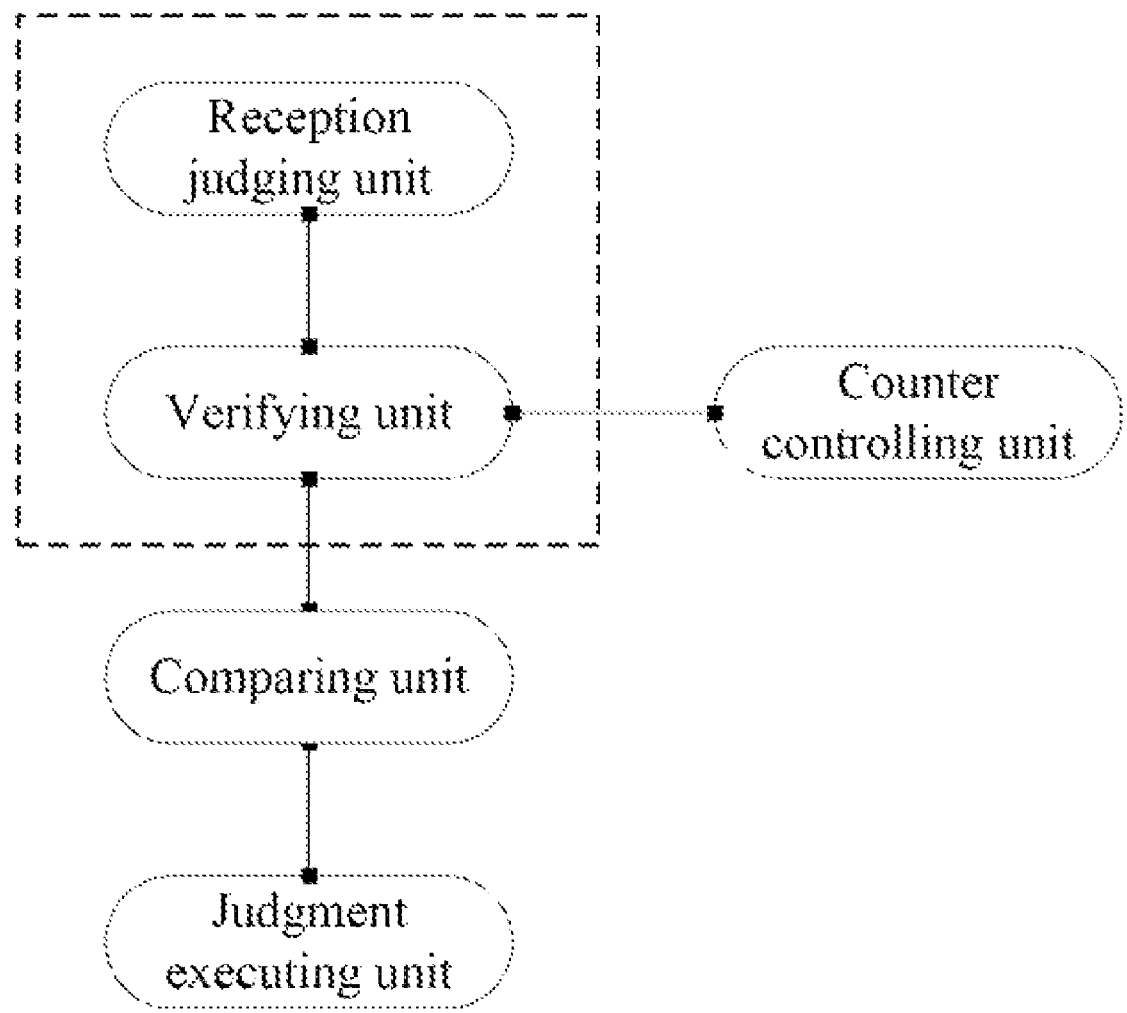
FIG. 2 is a schematic diagram of a structure of an apparatus provided according to an embodiment of the present invention.

An embodiment of the present invention provides an apparatus for defending against ARP spoofing attacks. FIG. 2 is a schematic diagram of the structure of the apparatus, which includes a reception judging unit and a verifying unit. When an ARP entry is updatable, the reception judging unit is configured to judge whether the MAC address in a received ARP message that has the same IP address as the ARP entry is the same as the MAC address in the ARP entry.

If the MAC addresses are different, the reception judging unit determines that the received ARP message is an ambiguous ARP message and reports the judgment result. If the MAC addresses are the same, the reception judging unit determines that no ambiguous ARP message is received and takes no action or reports the no-action judgment result.

The verifying unit is configured to start an ARP verification process according to the judgment result from the reception judging unit. The verification process may broadcast an ARP request to all network devices in the network segment, requesting the MAC address associated with the IP address. After the network device that has the IP address receives the ARP request, the network device unicasts an ARP response to the requester to notify the requester of its MAC address. After receiving the ARP response, the network device, namely, the requester, can use the MAC address carried in the ARP response to make a verification judgment.

The apparatus may further include a comparing unit, which is configured to compare the MAC address in the ARP verification response with the MAC address in the ARP entry and the MAC address in the ambiguous ARP message when the verifying unit starts the ARP verification process. If the MAC address in the ARP verification response is the same as one of the other two MAC addresses, the comparing unit makes an optimal judgment to take the ARP entry that has the same MAC address as the optimal ARP entry; if the MAC address in the ARP verification response is different from the other two MAC addresses, an optimal judgment is not made.

In addition, the apparatus further includes a judgment executing unit, which is configured to perform an appropriate operation according to the judgment result of the comparing unit. Specifically, if the comparing unit makes an optimal judgment, the judgment executing unit locks the optimal ARP entry so that the entry is not updated before its aging. Thus, address spoofing attacks happening possibly at any time are denied and the verification is more reliable and more effective. If the comparing unit fails to make an optimal judgment, the judgment executing unit retains the ARP entry as the normal ARP entry.

In addition, the apparatus further includes a counter controlling unit, which is configured to: set a counter for the ARP entry and control the verifying unit not to start a verification process with respect to the ARP entry when the number of ARP verifications reaches a specified counter value within an aging cycle of the entry. In this way, when large-traffic address spoofing attacks occur, a network device does not send too many verification messages which consume excessive CPU resources. Thus the device resources are saved.

To further explain the embodiments of the present invention, a specific example is given to further clarify the technical solution of the embodiments of the present invention. In the case of preventing the ARP table of a network device from being spoofed, the processing is as follows:

At the beginning, the initial learning of ARP entries in the network device is the same as normal processing. The network device generates an ARP entry from the initially received ARP message for encapsulating messages to be forwarded no matter whether the ARP message is an ARP request or an ARP response. At this time, the initially learned ARP entry is updatable.

Figure 3:
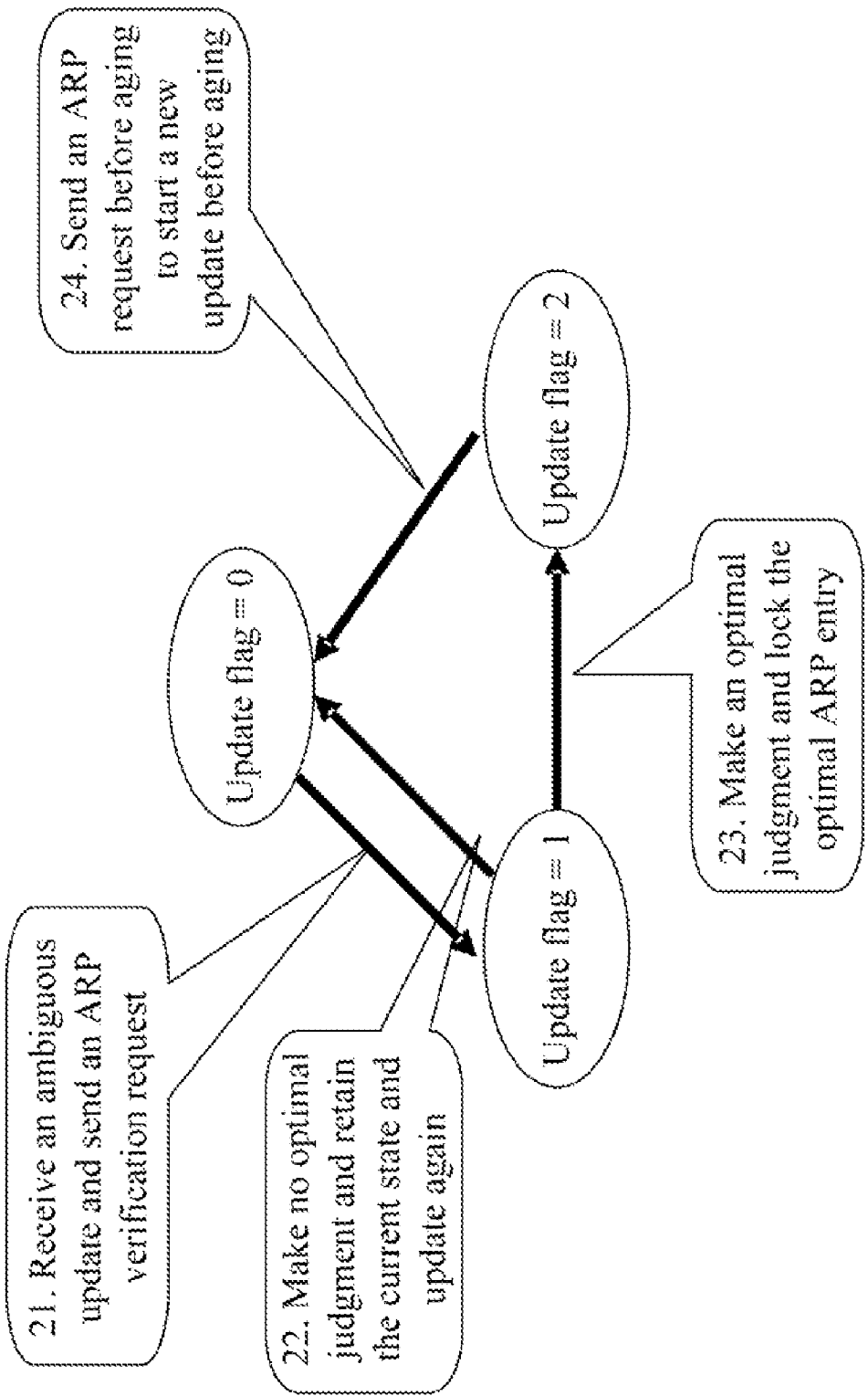
FIG. 3 is a schematic diagram showing the state change of the update flag according to an embodiment of the present invention.

FIG. 3 is a schematic diagram showing the state change of the update flag according to an embodiment of the present invention. As shown in FIG. 3, an update flag is set in the ARP entry. The initial value of the flag is 0 which indicates that the ARP entry is updatable and that the MAC address in the ARP entry can be updated. It is also set that every ARP entry in the network device can cache two MAC addresses: one is a master MAC address and the other is a temporary address. Here, the MAC address in the ARP entry, or the initially learned MAC address, is taken as the master MAC address and only the master MAC address is sent to the forwarding plane.

If it is determined that the MAC address in a received ARP message is different from the master MAC address, or that an ambiguous ARP message is received, the MAC address in the ambiguous ARP message is regarded as the temporary MAC address and a verification process is started. The verification method is to send an ARP request to the IP address in the ARP entry.

In this case, it is also necessary to change the update flag in the ARP entry to 1, as shown by "21" in FIG. 3. This indicates that the ARP entry only accepts the update from an ARP response. Then an ARP verification request is sent. Thus, before the ARP response is received, the content of the ARP entry including the temporary MAC address is not updated. In this way, the following is prevented: before the ARP response is received, the entry content changes, which makes a corresponding verification judgment impossible.

Assume that there are already two MAC addresses in the current ARP entry, MAC1 and MAC2, where MAC1 is the current master MAC address and MAC 2 is the ambiguous temporary MAC address and suppose MAC3 is the MAC address of the sender in the received ARP verification response. After the ARP verification response is received, there are three possibilities:

(1) MAC1, MAC2 and MAC3 are all different.

As shown by "22" in FIG. 3, in this case, an optimal judgment is not made and the MAC1 address is retained in the ARP entry, and MAC2 and MAC3 are ignored. The update flag in the ARP entry is changed to 0. The ARP entry is not updated and is still used as a normal entry. The flag also indicates that the ARP entry is updatable.

(2) MAC1 and MAC3 are the same.

As shown by "23" in FIG. 3, in this case, an optimal judgment can be made. The MAC1 address in the ARP entry is retained and regarded as the optimal ARP entry and MAC2 is ignored (indicating MAC2 is a spoofed address). The update flag is changed to 2. The optimal ARP entry is locked so that it is not updated before its aging.

(3) MAC2 and MAC3 are the same.

As shown by "23" in FIG. 3, in this case, an optimal judgment can be made. The master MAC address in the ARP entry is updated to MAC2 (indicating MAC1 is a spoofed address) and regarded as the optimal ARP entry and the ARP entry in the forwarding plane is refreshed. The update flag is changed to 2. The optimal ARP entry is locked so that it is not updated before its aging.

In addition, before the optimal ARP entry is aged, an ARP request is sent, and the update flag is set to 0, as shown by "24" in FIG. 3. The flag indicates a new update can be started.

To avoid the excessive consumption of CPU resources because too many verification messages are sent by a gateway in the case of large-traffic address spoofing attacks, a counter may be set for the ARP entry. When the number of verification processes started with respect to the entry reaches a given number within an aging cycle of the entry, no new verification is started with respect to the entry so that the device resources are saved.

Those skilled in the art understand that all or part of the steps in the preceding embodiments may be completed by hardware following instructions of a program. The program may be stored in a computer readable storage medium and when it is executed, the following steps are executed:

When the ARP entry is updatable, judge whether the MAC address in a received ARP message is the same as the MAC address in the ARP entry, where the ARP message has the same IP address as the ARP entry.

If the MAC addresses are different, regard the received ARP message as an ambiguous ARP message and start an ARP verification process; or else, no ARP verification process is started.

The storage medium may be a read-only memory, a magnetic disk or a compact disk.

To conclude, the embodiments of the present invention may reduce signaling interactions and save network resources. In addition, the spoofing attacks happening possibly at any time can be denied and address spoofing via random scanning is effectively avoided to protect the normal application of the real host. With the embodiments of the present invention, excessive CPU resources are not consumed when too many verification messages are sent by a network device in the case of large-traffic address spoofing attacks so that the device resources are saved.

Although the invention has been described through several exemplary embodiments, the invention is not limited to such embodiments. It is apparent that those skilled in the art can make various modifications and variations to the invention without departing from the scope of the present invention. The invention is intended to cover the modifications and variations provided that they fall in the scope of protection defined by the following claims or their equivalents.

What is claimed is:

1. A method for defending against Address Resolution Protocol (ARP) spoofing attacks implemented by a network device, comprising:
    setting an update flag in an ARP entry, wherein the ARP entry comprises an Internet Protocol (IP) address, a master Media Access Control (MAC) address, a temporary MAC address and the update flag; the update flag indicating whether the master MAC address and the temporary MAC address of the ARP entry can be updated before the ARP entry is aged;
    receiving an ARP message which has the same IP address as the ARP entry;
    when the update flag has a first value indicating that the ARP entry is updatable, judging whether an MAC address in the received ARP message is the same as the master MAC address in the ARP entry;
    if the MAC address in the received ARP message is different from the master MAC address, updating the temporary MAC address of the ARP entry according to the MAC address in the received ARP message;
    setting the update flag to a second value which indicates that the ARP entry is not updated before an ARP verification response is received; and
    starting an ARP verification process.

2. The method of claim 1, wherein the ARP verification process comprises:
    sending an ARP verification request to the IP address in the ARP entry;
    if the ARP verification response from the IP address is not received, retaining the ARP entry so that the ARP entry is not changed;
    if the ARP verification response from the IP address is received, making a verification judgment according to the MAC address in the ARP verification response.

3. The method of claim 2, wherein the making of the verification judgment according to the MAC address in the ARP verification response comprises:
    comparing the MAC address in the ARP verification response, the master MAC address in the ARP entry and the temporary MAC address in the ARP entry;
    if the MAC address in the ARP verification response is the same as one of the other two MAC addresses, making an optimal judgment, updating the master MAC address in the ARP entry according to the MAC address in the ARP verification response, and locking the ARP entry; and
    if the MAC address in the ARP verification response is different from the other two MAC addresses, retaining the ARP entry so that the ARP entry is not changed.

4. The method of claim 3, wherein locking the optimal ARP entry comprises:
    setting the update flag of the ARP entry to a third value which indicates that the ARP entry is not updated before its aging, even if the ARP message which has the same IP address with the ARP entry is received.

5. The method of claim 1, further comprising:
    setting a counter with respect to the ARP entry and starting no verification process for the ARP entry when the number of ARP verifications reaches a specified counter value within an aging cycle of the ARP entry.

6. The method of claim 3, further comprising:
    setting a counter with respect to the ARP entry and starting no verification process for the ARP entry when the number of ARP verifications reaches a specified counter value within an aging cycle of the ARP entry.

7. The method of claim 4, further comprising:
    setting a counter with respect to the ARP entry and starting no verification process for the ARP entry when the number of ARP verifications reaches a specified counter value within an aging cycle of the ARP entry.

8. An apparatus for defending against Address Resolution Protocol (ARP) spoofing attacks implemented by a network device,
    wherein the apparatus is configured to set an update flag in an ARP entry, wherein the ARP entry comprises an Internet Protocol (IP) address, a master Media Access Control (MAC) address, a temporary MAC address and the update flag; the update flag indicating whether the master MAC address and the temporary MAC address of the ARP entry can be updated before the ARP entry is aged;

wherein the apparatus further comprises:
a reception judging unit, configured to: receive an ARP message which has the same IP address as the ARP entry, when the update flag has a first value indicating that the ARP entry is updatable, judge whether an MAC address in the received ARP message is the same as the master MAC address in the ARP entry; and if the MAC address in the received ARP message is different from the master MAC address, update the temporary MAC address of the ARP entry according to the MAC address in the received ARP message, set the update flag to a second value which indicates that the ARP entry is not updated before an ARP verification response is received; and send a judgment result to a verifying unit; and
the verifying unit, configured to start an ARP verification process according to the judgment result from the reception judging unit.

9. The apparatus of claim 8, further comprising:
a comparing unit, configured to compare the MAC address in the ARP verification response, the master MAC address in the ARP entry and the temporary MAC address in the ARP entry after the verifying unit starts the ARP verification process;
if the MAC address in the ARP verification response is the same as one of the other two MAC addresses, make an optimal judgment and update the master MAC address in the ARP entry according to the MAC address in the ARP verification response; and
if the MAC address in the ARP verification response is different from the other two MAC addresses, configured to make no optimal judgment.

10. The apparatus of claim 9, further comprising:
a judgment executing unit, configured to execute an appropriate operation according to the judgment made by the comparing unit; and
if the comparing unit makes the optimal judgment, configured to set the update flag of the ARP entry to a third value which indicates that the ARP entry is not updated before its aging even the ARP message has the same IP address with the ARP entry is received; and if the comparing unit makes no optimal judgment, configured to retain the ARP entry so that the ARP entry is not changed.

11. The apparatus of claim 8, further comprising:
a counter controlling unit, configured to: set a counter with respect to the ARP entry and when the number of ARP verifications reaches a specified counter value within an aging cycle of the ARP entry, control the verifying unit to start no verification process for the ARP entry.

12. The apparatus of claim 9, further comprising:
a counter controlling unit, configured to: set a counter with respect to the ARP entry and when the number of ARP verifications reaches a specified counter value within an aging cycle of the ARP entry, control the verifying unit to start no verification process for the ARP entry.

13. The apparatus of claim 10, further comprising:
a counter controlling unit, configured to: set a counter with respect to the ARP entry and when the number of ARP verifications reaches a specified counter value within an aging cycle of the ARP entry, control the verifying unit to start no verification process for the ARP entry.

* * * * *